(12) United States Patent
Barriac et al.

(10) Patent No.: US 9,319,191 B2
(45) Date of Patent: Apr. 19, 2016

(54) SYSTEM AND METHOD FOR SELECTING MEDIUM ACCESS PARAMETERS FOR EACH COMMUNICATION SESSION

(71) Applicant: QUALCOMM Incorporated, San Diego, CA (US)

(72) Inventors: Gwendolyn Denise Barriac, Encinitas, CA (US); Hemanth Sampath, San Diego, CA (US); Santosh Paul Abraham, San Diego, CA (US); Rahul Tandra, San Diego, CA (US); Yan Zhou, San Diego, CA (US); Vincent Knowles Jones, IV, Redwood City, CA (US); Sameer Vermani, San Diego, CA (US); Simone Merlin, Solana Beach, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 188 days.

(21) Appl. No.: 14/102,358

(22) Filed: Dec. 10, 2013

(65) Prior Publication Data

US 2014/0198741 A1  Jul. 17, 2014

Related U.S. Application Data

(60) Provisional application No. 61/752,416, filed on Jan. 14, 2013.

(51) Int. Cl.
| | |
|---|---|
| *H04L 5/00* | (2006.01) |
| *H04W 74/00* | (2009.01) |
| *H04W 74/04* | (2009.01) |
| *H04W 84/12* | (2009.01) |

(52) U.S. Cl.
CPC ........... *H04L 5/0037* (2013.01); *H04W 74/002* (2013.01); *H04W 74/006* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2006/0092889 | A1* | 5/2006 | Lyons | H04W 16/08 370/338 |
| 2007/0072638 | A1* | 3/2007 | Yang | H04W 52/50 455/522 |
| 2007/0286122 | A1* | 12/2007 | Fonseca | H04L 1/0021 370/329 |
| 2009/0207747 | A1* | 8/2009 | Kim | H04L 43/0811 370/252 |
| 2012/0250617 | A1 | 10/2012 | Wentink | |

FOREIGN PATENT DOCUMENTS

| | | |
|---|---|---|
| EP | 2180751 A2 | 4/2010 |
| TW | 201131964 A | 9/2011 |

OTHER PUBLICATIONS

International Search Report and Written Opinion—PCT/US2013/074927, International Search Authority—European Patent Office, Mar. 14, 2014.

(Continued)

*Primary Examiner* — Eunsook Choi
(74) *Attorney, Agent, or Firm* — Knobbe Martens Olson & Bear LLP

(57) ABSTRACT

Systems and methods for selecting medium access parameters for each communication session are disclosed. In one aspect an access point includes a processor configured to select a value for a medium access parameter for a particular communication session between the access point and a wireless station.

16 Claims, 6 Drawing Sheets

(56) References Cited

OTHER PUBLICATIONS

Orfanos., et al., "Efficient Power Control for MC-CDMA based WLANs", Proceedings European Wireless 2005, Apr. 13, 2005, pp. 1-7, Nicosia, CyprusiSBN: 978-3-8007-2886-2. Retrieved from the Internet:URL:http://ieeexplore.ieee.org/xpls/abs_all.jsp?arnumber=5755314&tag= 1 [retrieved on Feb. 26, 2014].

Taiwan Search Report—TW102147557—TIPO—Apr. 28, 2015.

* cited by examiner

SYSTEM AND METHOD FOR SELECTING MEDIUM ACCESS PARAMETERS FOR EACH COMMUNICATION SESSION

RELATED APPLICATIONS

This application claims the benefit of priority to U.S. Provisional Application No. 61/752,416, entitled System and Method for Selecting Medium Access Parameters for Each Communication Session, filed Jan. 14, 2013, the disclosure of which is hereby incorporated herein by reference in its entirety.

BACKGROUND

1. Field

The present application relates generally to wireless communications, and more specifically to systems, methods, and devices for selecting medium access parameters for each communication session.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow tuning of medium access parameters.

One aspect of the disclosure provides an access point. The access point includes a processor configured to select a value for a medium access parameter for each individual communication session between the access point and each of a plurality of wireless stations.

Another aspect of the disclosure provides a method of wireless communication. The method includes selecting, at an access point, a value for a medium access parameter for each individual communication session between the access point and each of a plurality of wireless stations. The method may further include communicating, at the access point, with the wireless station using the selected value for the medium access parameter.

Another aspect of the disclosure provides an access point. The access point includes means for selecting a value for a medium access parameter for each individual communication session between the access point and each of a plurality of wireless stations, and means for communicating with the wireless station using the selected value for the medium access parameter.

Another aspect of the disclosure provides a non-transitory physical computer storage including computer executable instructions configured to implement a method for wireless communication by a station. The method includes selecting, at the access point, a value for a medium access parameter for each individual communication session between the access point and each of a plurality of wireless stations. The method may further include communicating, at the access point, with the wireless station using the selected value for the medium access parameter.

DETAILED DESCRIPTION

Figure 1:
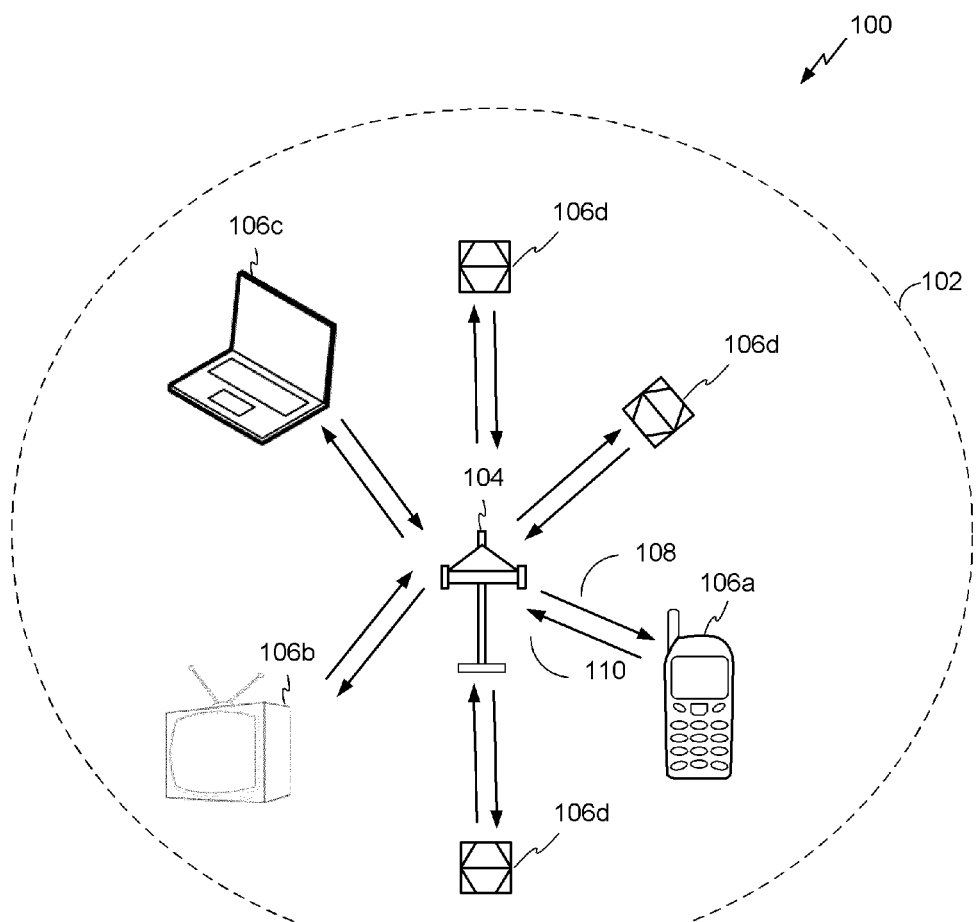
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless nodes, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers (i.e. does not transmit) for a period of time. The period of deferral is followed by a randomized backoff period i.e. an additional period of time in which the node wishing to transmit will not attempt to access the medium. The backoff period is used to resolve contention between different nodes trying to access a medium at the same time. The backoff period may also be referred to as a contention window. Backoff requires each node trying to access a medium to choose a random number in a range and wait for the chosen number of time slots before trying to access the medium, and to check whether a different node has accessed the medium before. The slot time is defined in such a way that a node will always be capable of determining if another node has accessed the medium at the beginning of the previous slot. In particular, the 802.11 standard uses an exponential backoff algorithm wherein each time a node chooses a slot and collides with another node; it will increase the maximum number of the range exponentially. If, on the other hand, a node wishing to transmit senses the medium as free for a specified time (called the Distributed Inter Frame Space (DIFS) in the 802.11 standard), then the node is allowed to transmit on the medium. After transmitting, the receiving node will perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

In wireless communications such as those specified in the IEEE 802.11 family of wireless protocols, multiple stations share a transmission medium using a media access control protocol such as the carrier sense multiple access (CSMA) described above. An access point carries traffic of different classes including video, audio and voice. The access point assigns different values for medium access parameters based on the traffic type. However, the access point does not customize values for medium access parameters for each communication session between the access point and a wireless station. Thus it is beneficial for the access point to have separate values for medium access parameters for each communication session, as doing so reduces undesired interference and increases medium reuse, especially in dense WiFi deployments.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d (e.g. a weather sensor or other sensor capable of communicating using a wireless protocol), to name a few.

Figure 2:
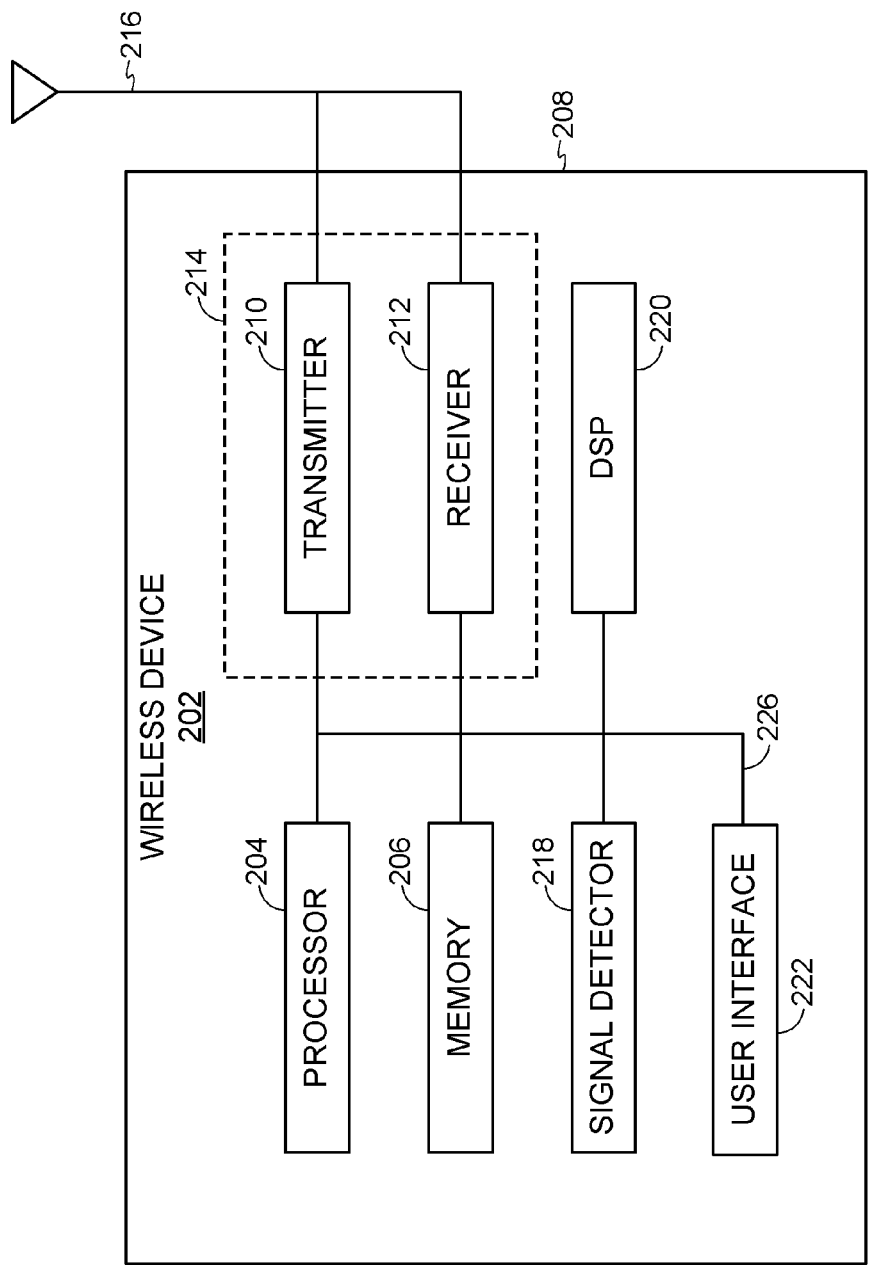
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
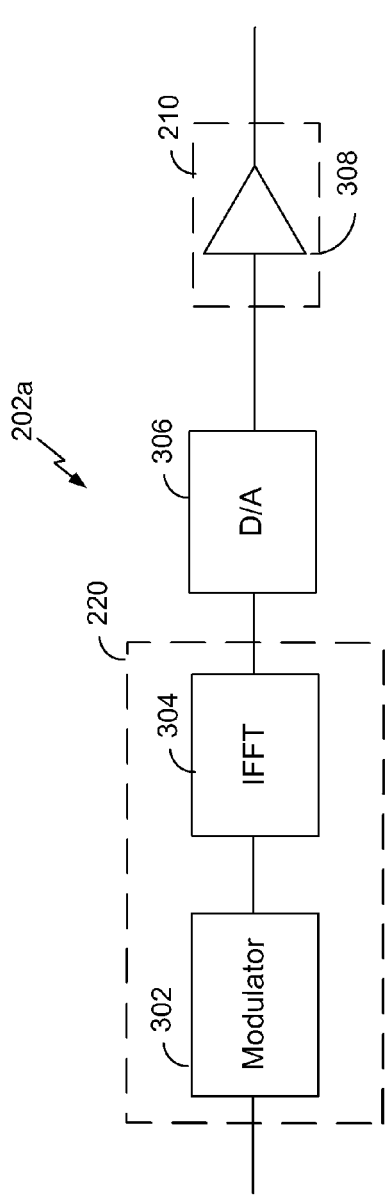
FIG. 3 illustrates an example of components that may be included within the wireless device of FIG. 2 to transmit wireless communications.

As discussed above, the wireless device 202 may comprise an AP 104 or a STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units with training fields with peak-to-power average ratio is as low as possible, as will be discussed in additional detail below. For ease of reference, the wireless device 202 configured with the components illustrated in FIG. 3 is hereinafter referred to as a wireless device 202a.

The wireless device 202a may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202a may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmission processor.

The analog signal may be wirelessly transmitted by the transmitter 210. The analog signal may be further processed before being transmitted by the transmitter 210, for example by being filtered or by being upconverted to an intermediate or carrier frequency. In the implementation illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets, frames, or data units in a wireless signal based on the analog signal. The data units may be generated using the processor 204 and/or the DSP 220, for example using the modulator 302 and the transform module 304 as discussed above.

Figure 4:
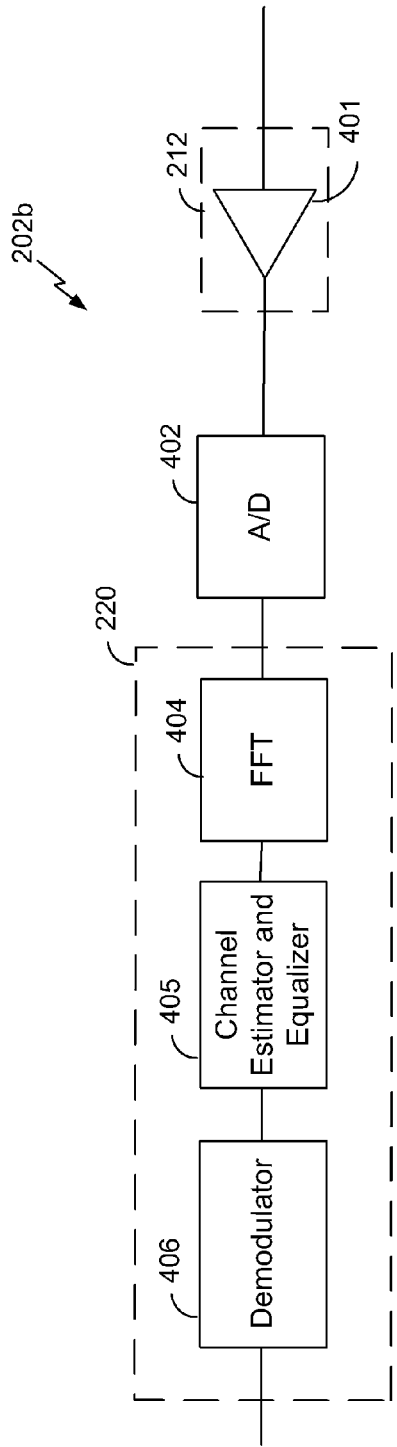
FIG. 4 illustrates an example of components that may be included within the wireless device of FIG. 2 to transmit wireless communications.

FIG. 4 illustrates various components that may be utilized in the wireless device 202 to receive wireless communications. The components illustrated in FIG. 4 may be used, for example, to receive OFDM communications. In some implementations, the components illustrated in FIG. 4 are used to receive packets, frames, or data units that include one or more training fields, as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets, frames, or data units in a wireless signal.

In the implementation illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202b may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further comprise a transform module 404 configured to convert the representation the wireless signal into a frequency spectrum. In FIG. 4, the transform module 404 is illustrated as being implemented by a fast Fourier transform (FFT) module. In some aspects, the transform module may identify a symbol for each point that it uses.

The wireless device 202b may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet, frame, or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized In wireless communications such as those specified in the IEEE 802.11 family of wireless protocols, multiple stations share a transmission medium using a media access control protocol such as the carrier sense multiple access (CSMA) described above. An access point carries traffic of different classes including video, audio and voice. The access point assigns different values for medium access parameters based on the traffic type. However, the access point does not customize values for medium access parameters for each communication session between the access point and a wireless station. Thus it is beneficial for the access point to have separate values for medium access parameters for each communication session, as doing so reduces undesired interference and increases medium reuse, especially in dense WiFi deployments.

In implementations as will be described below, an access point (AP) selects a value for a medium access parameter for a particular communication session between the AP and a wireless station or between the AP and each of a plurality of wireless stations. In one implementation, the access point provides a separate value for the medium access parameter for each communication session.

Figure 5:
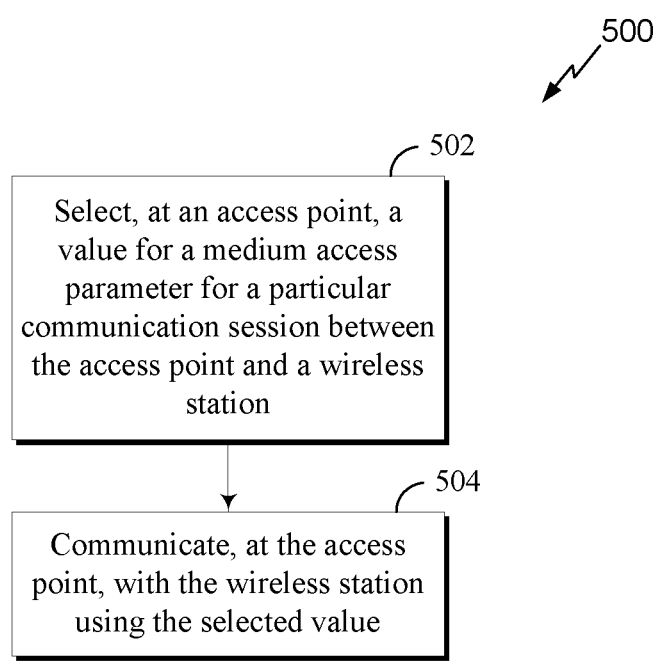
FIG. 5 is a flowchart of a method of wireless communication in accordance with one implementation.

FIG. 5 is a flowchart of a method of wireless communication in accordance with one implementation. The method 500 may be performed by an apparatus for wireless communication, such as the access point (AP) 104 (shown in FIG. 1). At block 502, the method includes selecting, at an access point, a value for a medium access parameter for each individual communication session between the access point and a wireless station. The value may be selected by, for example, the processor 204 (shown in FIG. 2). Moving to block 504, the method includes communicating, at the access point, with the wireless station using the selected value for the medium access parameter. The communication may be performed by, for example, the transceiver 214 (shown in FIG. 2). The method 500 thus allows an AP to adaptively customize the value for a medium access parameter for each communication session.

The AP may have a plurality of communication sessions at the same time, each being with a different wireless station. The AP may identify a separate value of the medium access parameter for each of the communication sessions. In other words, the value of the medium access parameter may be determined on a per-session basis. In one implementation, the AP identifies different values of the medium access parameter for at least two of the plurality of communication sessions. In one implementation, each AP may be treated as several virtual APs, with each virtual AP corresponding to one communication session (or a link) the AP establishes with a particular wireless station. Each virtual AP has its own settings (values) for one or more medium access parameters. The AP stores the settings for medium access parameters separately for each of the plurality of virtual APs.

The AP may identify a value of any medium access parameter for the particular wireless station. The parameter may be, for example, a transmission power level, which specifies the power level at which the AP transmits signals.

The parameter may also be a clear channel assessment (CCA) parameter such as a CCA threshold. As previously described, clear channel assessment (CCA) is used to determine the state of the medium before a node attempts to transmit thereon. The CCA procedure is executed while a node's receiver is turned on and the node is not currently transmitting a data unit such as a packet. The CCA threshold specifies a threshold for the CCA and may be used to adjust the sensitivity of the CCA. In one implementation, the AP is configured to have a lower CCA threshold (thus a more sensitive CCA) when the AP is transmitting at a higher power level, while having a higher CCA threshold (thus a less sensitive CCA) when the AP is transmitting at a lower power level. In another implementation, the value of the clear channel assessment threshold may be selected based on one or more of the following: a distance between the access point and the wireless station, a path loss between the access point and the wireless station, a target data rate for the communication session, and the type of traffic between the access point and the wireless station.

The medium access parameter may also be one of the parameters for carrier sense multiple access (CSMA). In a CSMA network utilizing collision avoidance (CA), a node wishing to transmit first senses the medium and if the medium is busy then it defers (i.e. does not transmit) for a period of time. The period of deferral is followed by a randomized backoff period (also referred to as "contention window") i.e. an additional period of time in which the node wishing to transmit will not attempt to access the medium. The backoff period is used to resolve contention between different nodes trying to access a medium at the same time. One CSMA parameter is the minimum duration for the contention window, which specifies the minimum time the node has to defer for the particular communication session. Another CSMA parameter is the duration of the randomized backoff period, which specifies the exact time the node has to defer for the particular communication session. In one implementation, the AP may have a different minimum duration for the contention window for each communication session. The AP may choose to increase the value of the minimum duration for the contention window if the communication session experiences failure in packet transmission. The AP may choose to serve the communication session with the smallest backoff period, thus allowing for more efficient scheduling.

Figure 6:
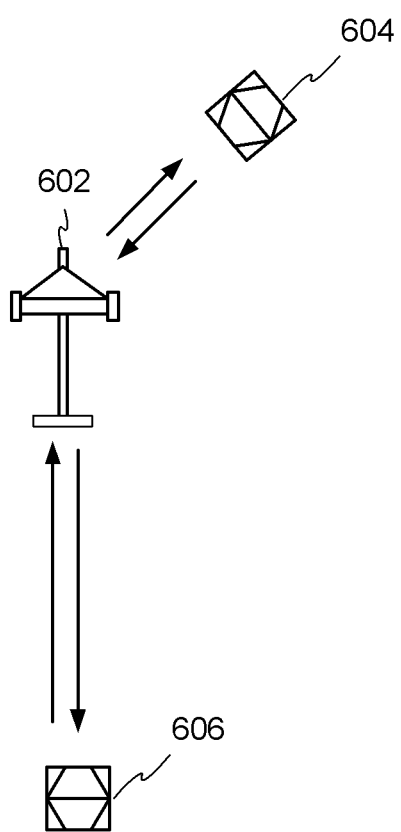
FIG. 6 shows one illustrative example with an access point concurrently accessing two wireless stations in accordance with one implementation.

FIG. 6 shows one illustrative example with an access point concurrently accessing two wireless stations in accordance with one implementation. The access point 602 is associated with a first wireless station 604 and a second wireless station 606. As shown, the wireless station 604 is located closer to the access point 602 than the wireless station 606. The access point 602 has a first communication session with the wireless station 604 and a second communication session with the wireless station 606. The first and the second communication session may be active at the same time.

In the some implementations, the access point 602 selects different values of the CCA threshold for the communication sessions. Particularly, the access point 602 selects a more sensitive CCA threshold for the second communication session with the wireless station 606, because the wireless station 606 is located at a more distant location than the wireless station 604. Thus, the access point 602 selects a first value of the CCA threshold for the first communication session higher than a second value for the second communication session. However, the implementation should not be limited to the CCA threshold; it could be applied apdatively to any medium access parameter. Thus, the access point may select a different value for any medium access parameter on a per communication session basis.

Figure 7:
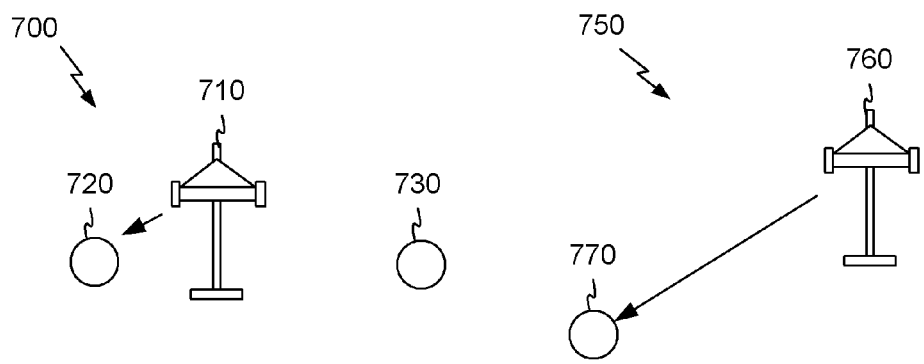
FIG. 7 illustrates one illustrative example with stations concurrently accessing access points.

FIG. 7 illustrates one example of simultaneous sessions between access points and stations. A first session, generally designated 700, refers to an access point 710 and a station 720, in close proximity to access point 710. A second session, generally designated 750, is also active between an access point 760 and a wireless station 770. In an embodiment, an access point 710 has traffic to communicate to wireless station 720, located in close proximity to access point 710. A third station 730 is also present, located between the APs 710, 760, but is not participating either session 700, 750. Because the distance between the AP 710 and wireless station 720 is significantly less than the distance between the AP 760 and the wireless station 770, the session 700 between AP 710 and station 720 may require less power than the communication session 750 between AP 760 and station 770. In general, this low-power communication session 700 between AP 710 and station 720 would not affect communication between AP 760 and station 770 because the low power would fall below the CCA threshold in use. However, if both APs 710 and 720 utilize the same value for the CCA threshold, AP 710 may sense and thus be affected by transmissions from the AP 760. As a result, when AP 710 attempts to access the medium, and AP 710 senses transmissions from AP 760 above the CCA threshold, AP 710 will defer session 700 so long as AP 710 senses AP 760 is using the medium.

In an embodiment, a separate value for the CCA threshold may be selected for each of the communication sessions 700, 750. A less sensitive CCA threshold (a higher value for the threshold) may be selected for the first communication session 700 than for the second communication session 750, a selection based on the significantly greater distance between AP 760 and wireless station 770 than between AP 710 and wireless station 720. Because AP 710 may make use of a less sensitive (higher) CCA threshold, the AP 710 may not be affected by session 750 and therefore not defer to the transmission between AP 760 and station 770. Thus, having a different CCA threshold value for each communication sessions 700, 750 allows two APs 710, 760 to transmit at the same time without interfering with each other.

Figure 8:
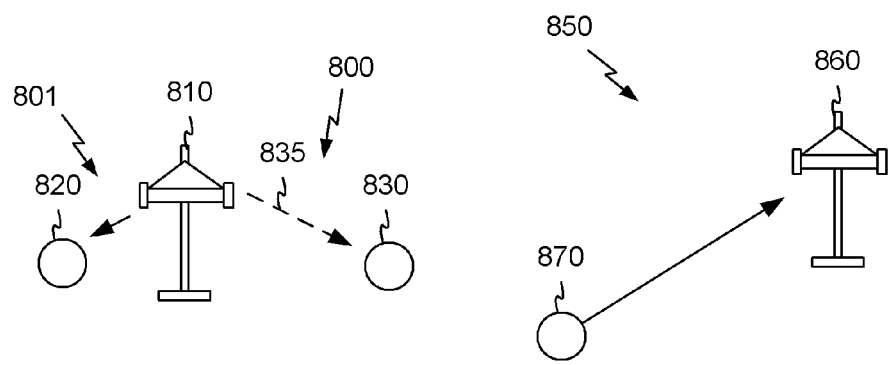
FIG. 8 illustrates another illustrative example with stations concurrently accessing access points.

FIG. 8 illustrates another embodiment with multiple stations concurrently communicating with access points. A first communication session generally designated 800, concerns an AP 810 and station 830. AP 810 is also involved in a communication session 801 with station 820. A third communication session generally designated 850, concerns AP 860 and uplink transmission from a station 870. Wireless station 870 is communicating via uplink transmission to an access point 860. At the same time, access point 810 wants to send packets to wireless station 830. However, as AP 810 conducts a CCA, it may sense the traffic of session 850, thus the interference resulting from wireless station 870, may prevent the packet transmission from the AP 810 to station 830. The attempted communication 835 between AP 810 and station 830 is designated by a dashed line. The interference sensed by AP 810 may then prompt a backoff period for AP 810 to wait before again attempting communications. If AP 810 uses a single value for the minimum duration of the contention window (CWmin), for all communication sessions, and communication 835 fails due to interference from session 850, the AP 810 may then increase the value for the minimum duration of the contention window. As a result, the AP 810 may have a wait time before being able to transmit again.

In an embodiment, the AP 810 may have a first communication session 800 with the station 830 and a second communication session 801 with the station 820. AP 802 may individually select a separate CWmin value for the minimum duration of the contention window for each of the communication sessions 800, 801. While the packet transmission 835 from the AP 810 to the station 830 fails due to use of the medium for session 850, the station 820 is not affected by the transmission from the station 812. Thus, AP 810 only increases the value for the minimum duration of the contention window for the communication session 800 with the station 830. As a result, having a separate value of the minimum duration of the contention window for each communication session 800, 801, AP 810 may continue session 801 without being affected by the CWmin and a backoff caused by the failed transmission 835 of session 800. Accordingly, such an embodiment may allow for more efficient user communications scheduling.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An access point for wireless communications, comprising:
   a processor configured to
      select a value for a medium access parameter for each individual communication session between the access point and each of a plurality of wireless stations, the medium access parameter comprising at least one of a clear channel assessment threshold and a minimum duration for contention window backoff period, the value for each medium access parameter being selected based at least in part on a path loss between the access point and each of the plurality of wireless stations, selecting the value comprising:
         select a first value for the medium access parameter for a first communication session between the access point and a first wireless station within the plurality of wireless stations, and
         select a second value for the medium access parameter for a second communication session between the access point and a second wireless station within the plurality of wireless stations, the first value being different from the second value, wherein the processor is configured to select a lower value for the clear channel assessment threshold based at least on determining whether the access point is increasing a transmission power level; and
   a transceiver configured to communicate with each of the plurality of wireless stations using the selected value for the medium access parameter for each individual communication session.

2. The access point of claim 1, the medium access parameter comprising a clear channel assessment parameter or a carrier sense multiple access parameter.

3. The access point of claim 1, the medium access parameter comprising a transmit power level.

4. The access point of claim 1, the medium access parameter comprising the clear channel assessment threshold, wherein the processor selects the value for the clear channel assessment threshold based at least one of the following:
   a distance between the access point and the wireless station;
   a target data rate for the communication session; and
   a type of traffic between the access point and the wireless station.

5. The access point of claim 1, the medium access parameter comprising the minimum duration for a contention window backoff period, wherein the processor is configured to increase the value for the minimum duration for a contention window backoff period when experiencing failure with the communication session between the access point and the wireless station.

6. The access point of claim 1, wherein the transceiver is configured to communicate with the first wireless station using the first value and to communicate with the second wireless station using the second value.

7. The access point of claim 1, the medium access parameter comprising the clear channel assessment threshold, wherein a distance between the access point and the first wireless station is shorter than a distance between the access point and the second wireless station, and wherein the first value for the clear channel assessment threshold is higher than the second value.

8. A method of wireless communication, comprising:
   selecting, at an access point, a value for a medium access parameter for each individual communication session between the access point and each of a plurality of wireless stations, the medium access parameter comprising at least one of a clear channel assessment threshold and a minimum duration for contention window backoff period, the value for each medium access parameter being selected based at least in art on a path loss between the access point and each of the plurality of wireless stations, selecting the value comprising:
      selecting, at the access point, a first value for the medium access parameter for a first communication session between the access point and a first wireless station within the plurality of wireless stations, and selecting, at the access point, a second value for the medium access parameter for a second communication session between the access point and a second wireless station within the plurality of wireless stations, the first value being different from the second value, wherein a processor is configured to select a lower value for the clear channel assessment threshold based at least on determining whether the access point is increasing a transmission power level; and communicating, at the access point, with each of the plurality of wireless stations using the selected value for the medium access parameter for each individual communication session.

9. The method of claim 8, the medium access parameter comprising a clear channel assessment parameter or a carrier sense multiple access parameter.

10. The method of claim 8, the medium access parameter comprising a transmit power level.

11. The method of claim 8, the medium access parameter comprising the clear channel assessment threshold, wherein the value for the clear channel assessment threshold is selected based on one or more of the following:
- a distance between the access point and the wireless station;
- a target data rate for the communication session; and
- a type of traffic between the access point and the wireless station.

12. The method of claim 8, the medium access parameter comprising the minimum duration for a contention window backoff period, further comprising increasing the value for the minimum duration for a contention window backoff period when experiencing failure with the communication session between the access point and the wireless station.

13. The method of claim 8, the communicating with the wireless station further comprising communicating with the first wireless station using the first value and communicating with the second wireless station using the second value.

14. The method of claim 8, the medium access parameter comprising the clear channel assessment threshold, wherein a distance between the access point and the first wireless station is shorter than a distance between the access point and the second wireless station, and wherein the first value for the clear channel assessment threshold is higher than the second value.

15. An access point for wireless communications, comprising:
means for selecting, at an access point, a value for a medium access parameter for each individual communication session between the access point and each of a plurality of wireless stations, the medium access parameter comprising at least one of a clear channel assessment threshold and a minimum duration for contention window backoff period, the value for each medium access parameter being selected based at least in cart on a path loss between the access point and each of the plurality of wireless stations, the means for selecting the value comprising:
 means for selecting a first value for the medium access parameter associated with a first communication session between the access point and a first wireless station of the plurality of wireless stations, and
 means for selecting a second value associated with the medium access parameter for a second communication session between the access point and a second wireless station of the plurality of wireless stations, the first value being different from the second value, wherein the means for selecting is configured to select a lower value for the clear channel assessment threshold based at least on determining whether the access point is increasing a transmission power level; and
means for communicating with each of the plurality of wireless stations using the selected value for the medium access parameter for each individual communication session.

16. The access point of claim 15, the medium access parameter comprising
the minimum duration for a contention window backoff period, wherein the means for selecting is configured to increase the value for the minimum duration for a contention window backoff period when experiencing failure with the communication session between the access point and the wireless station.

\* \* \* \* \*